United States Patent

Kato et al.

Patent Number: 5,481,064
Date of Patent: Jan. 2, 1996

[54] WASTE FLUID TREATMENT PROCESS

[75] Inventors: Kohei Kato; Tohru Yoshioka, both of Tokyo, Japan

[73] Assignee: Sanko Motor Chemical Co., Ltd., Tokyo, Japan

[21] Appl. No.: 206,100

[22] Filed: Mar. 3, 1994

Related U.S. Application Data

[63] Continuation of Ser. No. 881,023, May 8, 1992, abandoned.

[51] Int. Cl.$^6$ .................................................. A62D 3/00
[52] U.S. Cl. .................... 588/205; 588/215; 588/252; 588/255; 976/DIG. 383
[58] Field of Search ............ 44/628, 265; 252/634, 252/635; 976/DIG. 382, DIG. 383; 588/249, 251, 252, 255, 257, 205, 215

[56] References Cited

U.S. PATENT DOCUMENTS

| | | | |
|---|---|---|---|
| 4,009,116 | 2/1977 | Barr | 588/255 |
| 4,019,628 | 4/1977 | Derby | 588/249 |
| 4,122,048 | 10/1978 | Buchwalder et al. | 588/255 |
| 4,379,763 | 4/1983 | Clemens et al. | 588/235 |
| 4,518,508 | 5/1985 | Conner | 252/628 |
| 4,632,765 | 12/1986 | DeNeef | 588/255 |
| 4,778,627 | 10/1988 | Doan | 252/637 |
| 4,913,835 | 4/1990 | Mandel et al. | 976/DIG. 383 |

FOREIGN PATENT DOCUMENTS

| | | | |
|---|---|---|---|
| 94008 | 11/1983 | European Pat. Off. | 588/255 |
| 80-00047 | 1/1980 | WIPO | 588/255 |

OTHER PUBLICATIONS

Day Jr. et al. Quantititive Analysis, Prentice-Hall Englewood Cliffs N.J. 1974 pp. 425–426.

Primary Examiner—Gary P. Straub
Attorney, Agent, or Firm—Fish & Richardson

[57] ABSTRACT

A method is disclosed for solidification of waste fluids such as used antifreeze solutions, thereby facilitating disposal of said waste fluids. The method is applicable to aqueous waste fluids, which may be formed by addition of appropriate amounts of water, if necessary, to the original waste fluids. The method comprises mixing an ion adsorption agent with the aqueous waste fluid, followed by addition of a water-absorbent acrylic polymer material. Following agitation or stirring of the aqueous waste fluid/ion adsorption agent/water-absorbent polymer mixture, solidification is achieved. The solidified mixture is readily handled for disposal such as by incineration.

4 Claims, 1 Drawing Sheet

WASTE FLUID TREATMENT PROCESS

This application is a continuation of the application 07/881,023, filed May 8, 1992, now abandoned.

FIELD OF THE INVENTION

This invention relates to a waste fluid treatment process for used antifreeze solutions and other waste fluids. More specifically, the invention relates to methods for conversion of such waste fluids to a solid state.

BACKGROUND OF THE INVENTION

Increasing amounts of waste generated from used engine oil and used antifreeze are produced each year. For instance, it is estimated that approximately 2,000,000 tons of used antifreeze and 30,000 tons of used brake fluid are generated Annually in the world. Most or all of this waste material must be disposed of or recycled. In the United States and Japan it is estimated that about 650,000 tons and 70,000 tons, respectively, of used antifreeze are generated every year. These estimates of the amounts of used antifreeze in the United States and Japan do not include the amounts of water added to the antifreeze when the antifreeze is used for most purposes. In the United States, antifreeze is generally used at about a 1:1 ratio with water. Therefore, estimates of the amounts of used antifreeze solution generated should be on the order of twice the figures given above.

One of the conventional processes used to treat these waste fluids is incineration, but the process is cumbersome since the waste materials to be treated are fluids. Solidification of these waste fluids prior to a waste fluid treatment, such as incineration, was considered as an alternative to incineration of liquid forms.

The use of conventional water absorbent polymer materials for solidification of water-containing (aqueous) waste fluids has been well documented. Acrylic polymers represent one type of such water-absorbent material. However, aqueous waste fluids that contain oils and fats and other impurities frequently are not converted to a desirable solid state when such a water absorbent polymer is added. This is because the water absorption rate and the water absorption capability of the water-absorbent polymer materials are reduced in the presence of oils, fats and other such impurities.

Therefore, there is a need to develop a treatment technology which can convert aqueous waste fluids that contain oils and fats and other impurities, or even comparable waste fluids that do not contain water, into a desirable solid state. An object of the present invention is development of such a treatment technology for conversion of the described waste fluids to usable solid states.

SUMMARY OF THE INVENTION

To accommodate this objective, the waste fluid treatment process of the present invention comprises mixing an ion adsorption agent with a fluid to be treated, the subsequent addition of a water absorbent acrylic polymer and the agitation of the resulting mixture. Waste fluids that do not contain water may be mixed with an effective amount of water prior to addition of the ion adsorption agent. The viscosity of a mixture composed of water, a target fluid, a water absorbent acrylic polymer, and an ion absorption agent increases gradually until the mixture becomes solidified. The invention is readily applicable to treatment of used antifreeze solutions.

The waste fluid treatment process of of this invention can be used to attain an excellent state of solidification in an aqueous waste fluid that contains oils, fats or other impurities, or a waste fluid which does not contain water, and provides for easier handling of waste fluid for purposes of disposal.

DETAILED DESCRIPTION

Figure 1:
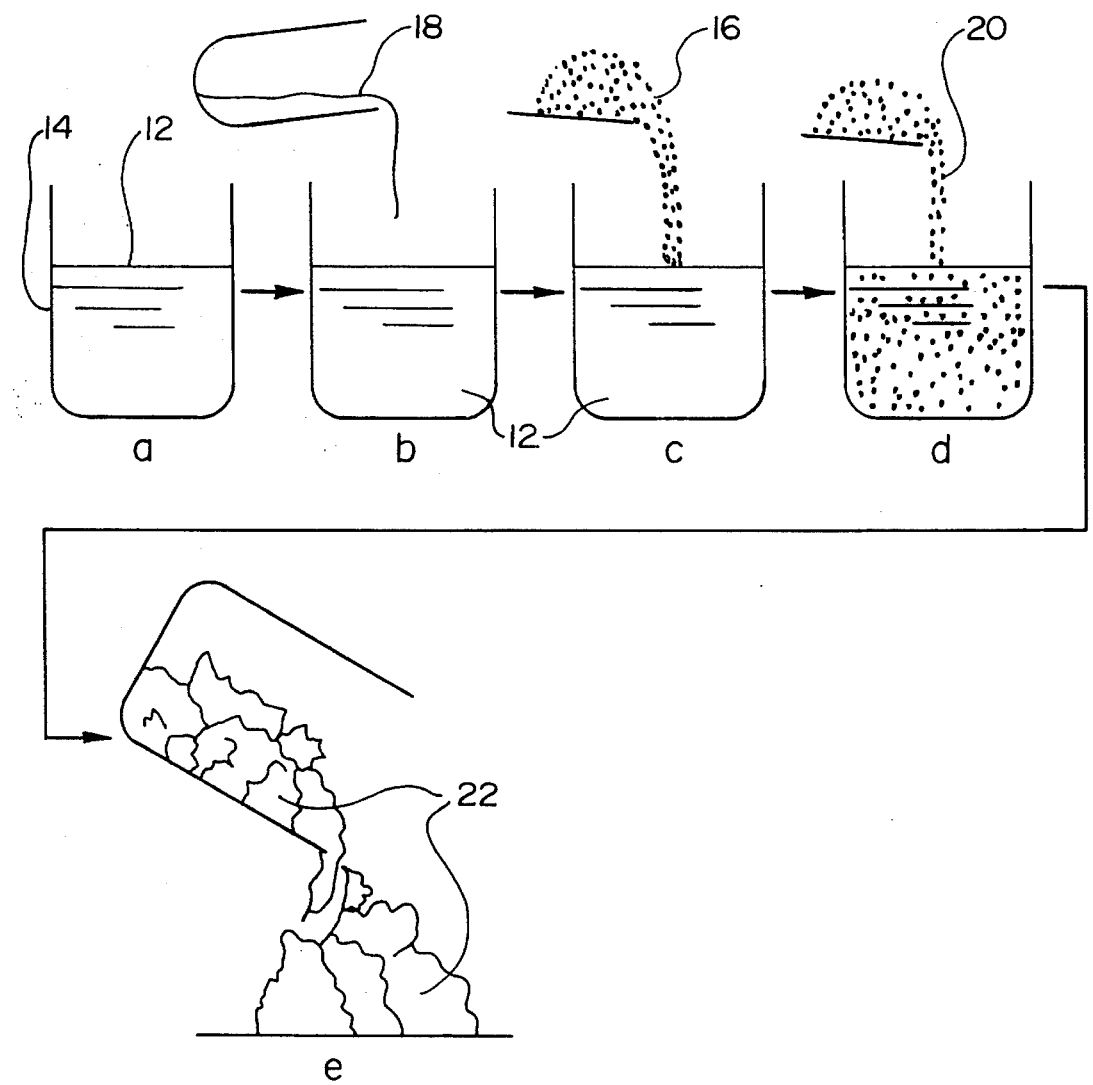
FIG. 1 is a schematic depiction of the treatment steps of the present invention.

Turning now to the embodiment depicted in FIG. 1, the fluid to be treated 12 is first placed in a container 14. The fluid to be treated may be a used surfactant, an antifreeze solution, brake fluid, engine oil or other waste fluid.

An ion adsorption agent 16 is blended or mixed with the waste fluid 12 targeted for this treatment. A material that is capable of adsorbing ions in water is used as an ion absorption agent 16. Examples of such ion adsorption agents include, without limitation, diatomaceous earth, zeolite, activated carbon, silica gel, and calcium carbonate. The amount of the ion adsorption agent added should be from about 0.1 part to about 40 parts ion adsorption agent per 100 parts waste fluid, preferably from about 1 part to about 10 parts ion adsorption agent per 100 parts waste fluid, by volume.

If the waste fluid contains no water or an insufficient amount of water, then water 18 is added before the ion adsorption agent 16 is mixed with the waste fluid. The volume of water 18 added may be from about 0.1 to about 3 times the volume of the fluid 12 to be treated, preferably from about 0.33 to about 1 times the volume of the fluid 12 to be treated.

Next, a water-absorbent acrylic polymer 20, such as an acrylic ester polymer, is added, and the mixture is stirred or otherwise agitated. Examples of such a water-absorbent acrylic ester polymer include, for example, "Aqua Keep," made by Seitetsu Kagaku Kogyo K.K., and "Aqua Lick CA (trademark)," made by Nippon Shokubai Kagaku Kogyo K.K. Any functionally equivalent acrylic ester polymers suitable for absorption of water may be employed in the present invention. The volume of water-absorbent acrylic polymer added should be from about 0.5 to about 300 parts acrylic polymer per 100 parts waste fluid/ion adsorption agent mixture, preferably from about 5 parts to about 100 parts acrylic polymer per 100 parts waste fluid/ion adsorption agent mixture, by volume. If water 18 is required to be added to the waste fluid 12 prior to addition of the ion adsorption agent 16, then the above ratios are calculated on the basis of the total amount of waste fluid and water.

The operations described above may be conducted at room temperature, although other temperatures may be used without departing from the method of the present invention.

The viscosity of the above-referenced mixture of water, waste fluid, ion adsorption agent and water-absorbent acrylic polymer increases gradually until a solidified mixture 22 is obtained as depicted in FIG. 1($d$).

The invention is illustrated by the following example:

EXAMPLE (1) Reagents (a) Antifreeze fluid (stock solution) corresponding to the following composition:

Ethylene glycol 90–95%
Water 2–4%
Rust inhibiting agent (salts) 2–8%

(b) "Aqua Keep" 10SH (highly water-absorbent acrylic polymer) made by Seitetsu Kagaku Kogyo K.K.
(c) Diatomaceous earth made by Kukita Yakuhin Kogyo K.K.
(d) Tap water.

(2) Procedure.

(a) Fifty grams (100 ml) of various aqueous antifreeze fluids containing different concentrations of ethylene glycol were placed in 300 ml-capacity beakers.
(b) The contents of the beakers described in (a) were agitated while a measured amount of diatomaceous earth was added.
(c) Measured amounts of Aqua Keep 10SH were added and the mixtures were agitated for three minutes.

(3) Results.

The results are presented in Tables 1 and 2. "A," "B," and "C" in the Tables represent three different forms of physical measurements of the mixtures described above. The measurements were taken following completion of the above-referenced steps. The procedures for physical measurements "A," "B," and "C," and the relative rating criteria for the results of each measurement, presented in the Tables as "1," "2," or "3," are described below:

A. Evaluation of fluid separation.

A mixture was placed on course-grade laboratory filter paper.

Ratings

1. The fluid penetrated and spread out on the filter paper.
2. The fluid penetrated the paper but did not spread.
3. Fluid penetration of the paper was not observed.

B. Evaluation of fluidity.

The beakers containing the mixtures were tipped over on their sides.

Ratings

1. The mixture moved a horizontal distance of at least 2 cm within ten seconds.
2. The mixture moved a horizontal distance of less than 2 cm within ten seconds.
3. The mixture did not move at all.

C. Evaluation of hardness

A 20 g weight was gently placed on the surface of each of the mixtures, and the position of the weight was checked after 30 seconds.

Ratings

1. The weight sank into the mixture until completely covered.
2. The weight partially sank into the mixture but was not completely covered.
3. The weight did not sink into the mixture at all.

TABLE 1

| Antifreeze Concentration % | Diatomaceous Earth % | Aqua Keep 10SH % | | | | | | | | | | | | | |
|---|---|---|---|---|---|---|---|---|---|---|---|---|---|---|---|
| | | 1 | | | 3 | | | 5 | | | 7 | | | 9 | | |
| | | A | B | C | A | B | C | A | B | C | A | B | C | A | B | C |
| 15 | 0 | 1 | 2 | 1 | 2 | 3 | 1 | 2 | 3 | 2 | 3 | 3 | 2 | 3 | 3 | 2 |
| 15 | 3 | 2 | 3 | 3 | 3 | 3 | 2 | 3 | 3 | 3 | 3 | 3 | 3 | 3 | 3 | 3 |
| 30 | 0 | 1 | 1 | 1 | 2 | 3 | 1 | 2 | 3 | 2 | 3 | 3 | 2 | 3 | 3 | 2 |
| 30 | 3 | 2 | 3 | 2 | 3 | 3 | 3 | 3 | 3 | 3 | 3 | 3 | 3 | 3 | 3 | 3 |
| 45 | 0 | 1 | 1 | 1 | 2 | 3 | 1 | 2 | 3 | 2 | 2 | 3 | 2 | 2 | 3 | 3 |
| 45 | 3 | 1 | 1 | 1 | 3 | 3 | 2 | 3 | 3 | 3 | 3 | 3 | 3 | 3 | 3 | 3 |
| 60 | 0 | 1 | 1 | 1 | 2 | 3 | 1 | 2 | 3 | 2 | 3 | 3 | 2 | 3 | 3 | 3 |
| 60 | 3 | 1 | 1 | 1 | 3 | 3 | 2 | 3 | 3 | 3 | 3 | 3 | 3 | 3 | 3 | 3 |

TABLE 2

| Antifreeze Concentration % | Aqua Keep 10SH % | Diatomaceous Earth % | | | | | | | | | | | | | |
|---|---|---|---|---|---|---|---|---|---|---|---|---|---|---|---|
| | | 1 | | | 3 | | | 5 | | | 7 | | | 9 | | |
| | | A | B | C | A | B | C | A | B | C | A | B | C | A | B | C |
| 30 | 1 | 1 | 2 | 1 | 2 | 3 | 2 | 2 | 3 | 2 | 2 | 3 | 2 | 2 | 3 | 2 |
| 30 | 3 | 2 | 3 | 2 | 3 | 3 | 2 | 3 | 3 | 3 | 3 | 3 | 3 | 3 | 3 | 3 |

The mixtures that received the ratings of "3" were most readily handled after the antifreeze fluid was solidified, and were judged to have achieved the intended solidification objective. When Aqua Keep 10SH alone was used, the desired solidification state (ratings of "3" in all three physical measurements) was achieved in practically none of the mixtures containing 1–9% of Aqua Keep 10SH. A coolant solution sample containing an antifreeze fluid solidified upon the addition of at least 1% of Aqua Keep 10SH when diatomaceous earth was also added. The desired solidification state was achieved when at least 3% of diatomaceous earth was added.

Having disclosed the subject matter of this invention, it should be apparent that many substitutions, modifications and variations of the invention are possible in light of the above teachings. It is therefore to be understood that the invention as taught and described herein is only limited to the extent of the breadth and scope of the appended claims.

What is claimed is:

1. A process for treatment of a liquid, comprising:

(1) providing a waste aqueous liquid comprising a used organic antifreeze solution, said organic antifreeze solution comprising a liquid organic compound containing at least one OH group:

(2) forming a solidification mixture consisting essentially of said waste aqueous liquid, a water-absorbing acrylic polymer and an ion adsorption agent, said ion adsorption agent selected from the group consisting of diatomaceous earth, zeolite, activated carbon, silica gel and calcium carbonate, said mixture formed by first mixing said ion adsorption agent with said waste aqueous liquid and then adding said water-absorbing acrylic polymer to said mixture of said ion adsorption agent and said waste aqueous liquid; and (3) agitating said solidification mixture for a time effective to solidify said solidification mixture.

2. The process of claim 1, wherein said ion adsorption agent is diatomaceous earth.

3. The process of claim 1, wherein said used organic antifreeze solution comprises a glycol or a mixture of glycols.

4. The process of claim 1, further comprising the step of incinerating said solid mixture.

* * * * *